US012756921B2

(12) United States Patent
Fee et al.

(10) Patent No.: US 12,756,921 B2
(45) Date of Patent: Oct. 6, 2026

(54) SYSTEM AND METHOD FOR PROTECTING AN ELECTRONIC SYSTEM IN PACKAGING

(71) Applicant: Tyco Fire & Security GMBH, Neuhausen am Rheinfall (CH)

(72) Inventors: Paul Fee, Belfast (GB); Peter Lawrence, Lisburn (GB); Terence Neill, Lisburn (GB)

(73) Assignee: Tyco Fire & Security GMBH, Neuhausen am Rheinfall (CH)

( * ) Notice: Subject to any disclaimer, the term of this patent is extended or adjusted under 35 U.S.C. 154(b) by 170 days.

(21) Appl. No.: 18/738,940

(22) Filed: Jun. 10, 2024

(65) Prior Publication Data

US 2024/0414426 A1 Dec. 12, 2024

Related U.S. Application Data

(60) Provisional application No. 63/472,100, filed on Jun. 9, 2023.

(51) Int. Cl.
*H04N 23/60* (2023.01)

(52) U.S. Cl.
CPC .................................. *H04N 23/60* (2023.01)

(58) Field of Classification Search
CPC ...... H04N 23/60; H04N 23/66; H04N 23/661; H04N 23/51; G06F 21/86
See application file for complete search history.

(56) References Cited

U.S. PATENT DOCUMENTS

| | | | | |
|---|---|---|---|---|
| 10,074,247 | B1 | 9/2018 | Tang et al. | |
| 2006/0205445 | A1* | 9/2006 | Sakaniwa ............ | H04W 64/00 455/12.1 |
| 2013/0342518 | A1* | 12/2013 | Nakata .................. | H04N 23/88 345/207 |
| 2014/0172620 | A1 | 6/2014 | Kumar Somayajula et al. | |
| 2015/0280470 | A1 | 10/2015 | Petzold | |
| 2018/0253632 | A1 | 9/2018 | Uland et al. | |
| 2019/0095660 | A1* | 3/2019 | Ueno .................... | H04B 5/263 |
| 2023/0393837 | A1* | 12/2023 | Zhang .................. | H04L 9/0891 |
| 2024/0155341 | A1* | 5/2024 | Smilansky ........... | H04W 12/06 |

* cited by examiner

*Primary Examiner* — Timothy J Henn
(74) *Attorney, Agent, or Firm* — ArentFox Schiff LLP

(57) ABSTRACT

A method, computer-readable medium, and/or system are configured for protecting an electronic system in packaging. These aspects include electrically detecting, by a controller of the electronic system, an in-package state of the electronic system with respect to the packaging. These aspects further include limiting, by the controller, the electronic system from performing one or more first set of functions of a plurality of functions responsive to the in-package state indicating the electronic system is within the packaging

28 Claims, 16 Drawing Sheets

SYSTEM AND METHOD FOR PROTECTING AN ELECTRONIC SYSTEM IN PACKAGING

CLAIM OF PRIORITY

The present application claims priority to U.S. Provisional Application No. 63/472,100, filed on Jun. 9, 2023, hereby incorporated herein by reference in its entirety.

FIELD

The present disclosure relates generally to electronic systems. More particularly, the present disclosure relates to protecting an electronic system that is packaged.

BACKGROUND

Closed circuit television (CCTV) camera system installation involves both software setup and physical installation. Software setup can be performed while the camera system is in packaging, such as in a box, if the network port is easily accessible. However, problems arise if some camera system features are not avoided while boxed.

This is true of many electronic systems that are shipped from one location to another.

Hence, there is a need for improvements in such systems.

SUMMARY

The following presents a simplified summary of one or more aspects in order to provide a basic understanding of such aspects. This summary is not an extensive overview of all contemplated aspects and is intended to neither identify key or critical elements of all aspects nor delineate the scope of any or all aspects. Its sole purpose is to present some concepts of one or more aspects in a simplified form as a prelude to the more detailed description that is presented later.

The present aspects relate to systems, methods, and computer-readable media configured to disable certain system features of the camera system when the camera system is still packaged, thereby avoiding damage to the camera system.

According to aspects of the present disclosure, a method is provided for protecting an electronic system in packaging. The method includes electrically detecting, by a controller of the electronic system, an in-package state of the electronic system with respect to the packaging. The method further includes limiting, by the controller, the electronic system from performing one or more first set of functions of a plurality of functions responsive to the in-package state indicating the electronic system is within the packaging.

According to other aspects of the present disclosure, a computer program product is provided for protecting an electronic system in packaging. The computer program product includes a non-transitory computer readable storage medium having program instructions embodied therewith. The program instructions are executable by a controller to cause the controller to perform a method. The method includes electrically detecting an in-package state of the electronic system with respect to the packaging. The method further includes limiting the electronic system from performing one or more first set of functions of a plurality of functions responsive to the in-package state indicating the electronic system is within the packaging.

According to further aspects of the present disclosure, an electronic system is provided. The electronic system includes a controller. The controller is configured to electrically detect an in-package state of the electronic system with respect to the packaging. The controller is further configured to limit the electronic system from performing one or more first set of functions of a plurality of functions responsive to the in-package state indicating the electronic system is within the packaging.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, wherein dashed lines may indicate optional elements, and in which.

DETAILED DESCRIPTION

Figure 1:
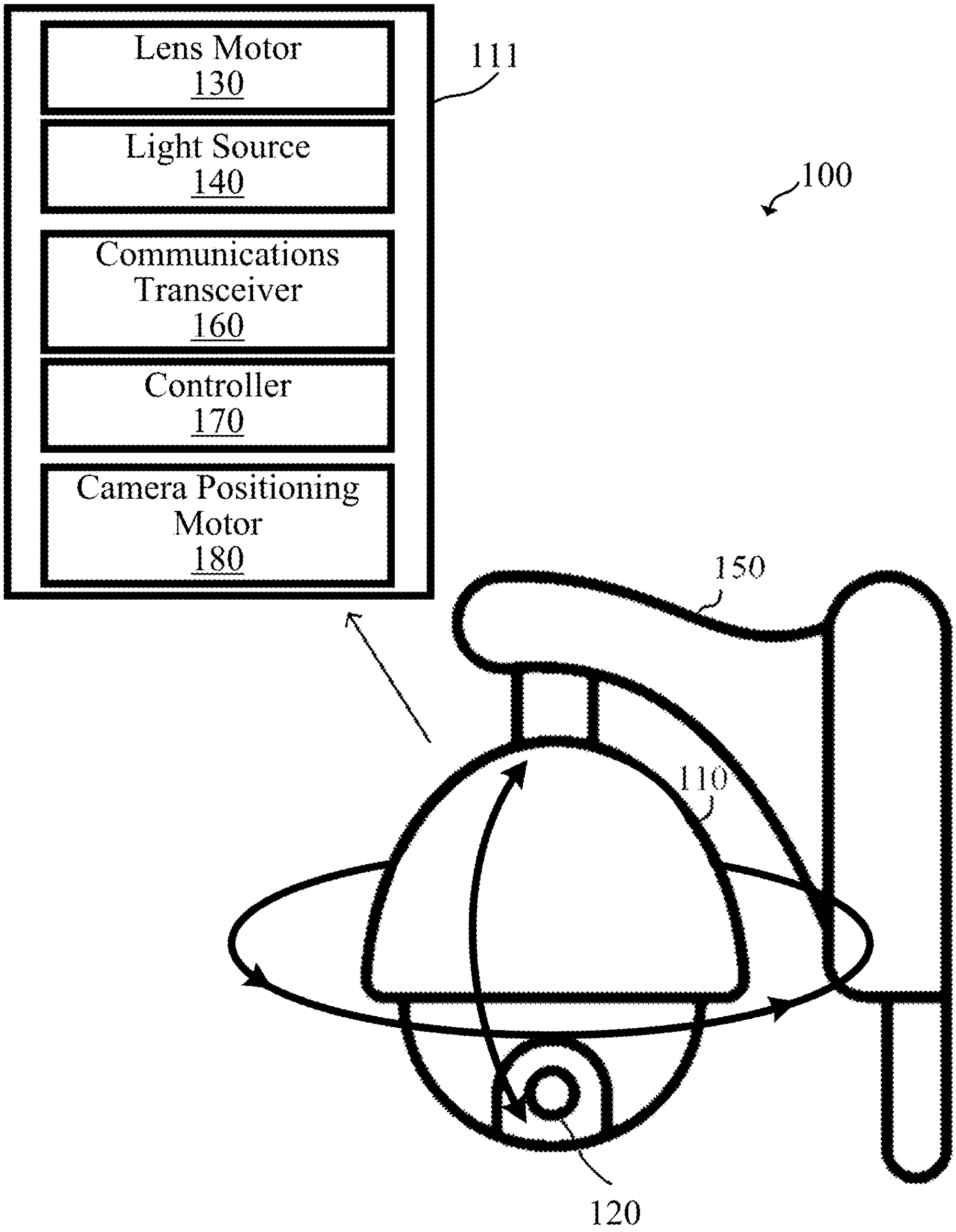
FIG. 1 is a block diagram of an example of a camera system, in accordance with an example aspect.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

Aspects of the present disclosure relate to circuit arrangements in any electronic system having a controller and one or more functions that should be prevented from being performed while the electronic system is within packaging to potentially avoid damage to the electronic system, the packing, and/or their surroundings. While one or more aspects of the present disclosure describe a camera system as a target device to be protected while in packaging, other example electronic systems include those with processor controlled motors, such as, but not limited to, clothes washers, clothes dryers, dish washers, fans, cameras, and so forth. As described herein, the controller or processor of the electronic system is used to limit one or more functions of the electronic system while packaged, responsive to receiving a corresponding signal indicating a packaged state. A separate power source may or may not be needed to implement aspects of the present disclosure, as many devices include their own battery backup in the case of power outage, as well as have their own battery power source as primary power as in the case of a camera.

In one implementation, for instance in a camera system, a myriad of ways exist to potentially damage the camera system when the camera system is operating in some manner while boxed and/or otherwise packaged (hereinafter "packaged" or "in packaging"). For example, a lens calibration should not be performed to avoid damaging the lens and/or losing a known position. As another example, a motor calibration should not be performed to avoid damage to the motors and/or belt/gear, or cause slippage, and/or to avoid loss of a known position. As yet another example, motor movement should not be performed as it may cause the box to shift, perhaps falling off a table/shelf. As a further example, infrared (IR) lighting should not be turned on to avoid thermal issues when the camera system is still in foam packaging. As a still further example, prolonged operation of the camera system while in packaging may also pose a fire hazard if it generates too much heat within the confined space of the packaging.

As further examples, but not limited hereto, it is undesirable for drum of a washing machine to turn or for a motor or blades of a fan to spin while the washing machine and fan are packaged.

Accordingly, aspects of the present disclosure are directed to the sensing of a packaging state of an electronic system in order to limit one or more of a plurality of available functions, where such one or more functions can be dangerous or damaging functions if performed when the electronic system is packaged. Correspondingly, techniques are proposed for limiting the functioning of the electronic system while in a boxed state. In this way, electronic system self-damage can be avoided.

Referring to FIG. 1, an example electronic system, such as but not limited to a camera system 100, is shown in accordance with an example aspect.

Camera system 100 includes a camera system housing 110 for containing and/or mounting elements of the camera system 100, an adjustable focus lens 120 for obtaining light and hence adjusting a field of view of the camera system 100, a lens motor 130 for adjusting the lens 120, a light source 140 for illuminating a field of view of the camera system 100 with light such as infrared light and/or visible light, a camera system mount 150 for attaching the camera system 100 to another structure, a communications transceiver 160 for transmitting and receiving one or more types of wireless and/or wireline signals (such as Wi-Fi, cellular, near field communication, Ethernet, and/or any other type of communication protocol signals), a controller 170 for controlling the operation of one or more of the components of the camera system 170, and, optionally, a camera positioning motor 180 for enabling panning movements 182 and/or tilting movements 184 to change a field of view of the camera system 100. For instance, the controller 170 may be a computer device and/or one or more processors. On board elements 111, which are components mounted within the camera system housing 110, may include one or more of: the lens motor 130; the IR light source 140; the communications transceiver 160; the controller 170; and/or the camera positioning motor 180. In an aspect, controller 170 performs at least part of the aspects of the present disclosure, as described in further detail herein. One or more of the preceding elements may be omitted in other aspects.

In an example implementation, the controller 170 is configured to control and operate one or any combination of the lens motor 130 to control focusing of the adjustable focus lens 120, the light source 140 to control an amount and/or type of light to be projected, the communications transceiver 160 to control transmission or receipt of signal, as well as controller-based camera system functions including a first set of functions (e.g., focus, lighting, etc.) of a plurality of functions that can potentially damage the camera system and a second set of functions (e.g., downloading software, firmware updates, configuring updates, configuring user information, setting a date and/or a time) of the plurality of functions that are able to be performed when the camera system is packaged without damaging the camera system.

In some aspects, the position or direction of view of the camera system 100 may be fixed, whereas in other aspects the camera positioning motor 180 is operable by the controller 170 to move the camera system 100 to a desired position or direction of view. Such movements may include, for example, pan and tilt movements. In one implementation, for example, control of camera system position of camera system 100 can be by remote joystick or buttons via signals received by communications transceiver 160.

In an aspect, camera system housing 110 is connected to camera system mount 150, and camera system housing 110 at least partially includes adjustable focus lens 120, lens motor 130, light source 140, communications transceiver 160, controller 170, and camera positioning motor 180.

It is to be appreciated that camera system 100 may include further components (e.g., a microphone, etc.) or omit certain components (e.g., camera positioning motor 180).

It is to be further appreciated that while a dome CCTV camera is shown, aspects of the present disclosure can use other types of CCTV cameras as well as other camera types given the teachings of the present disclosure provided herein.

Figure 2:
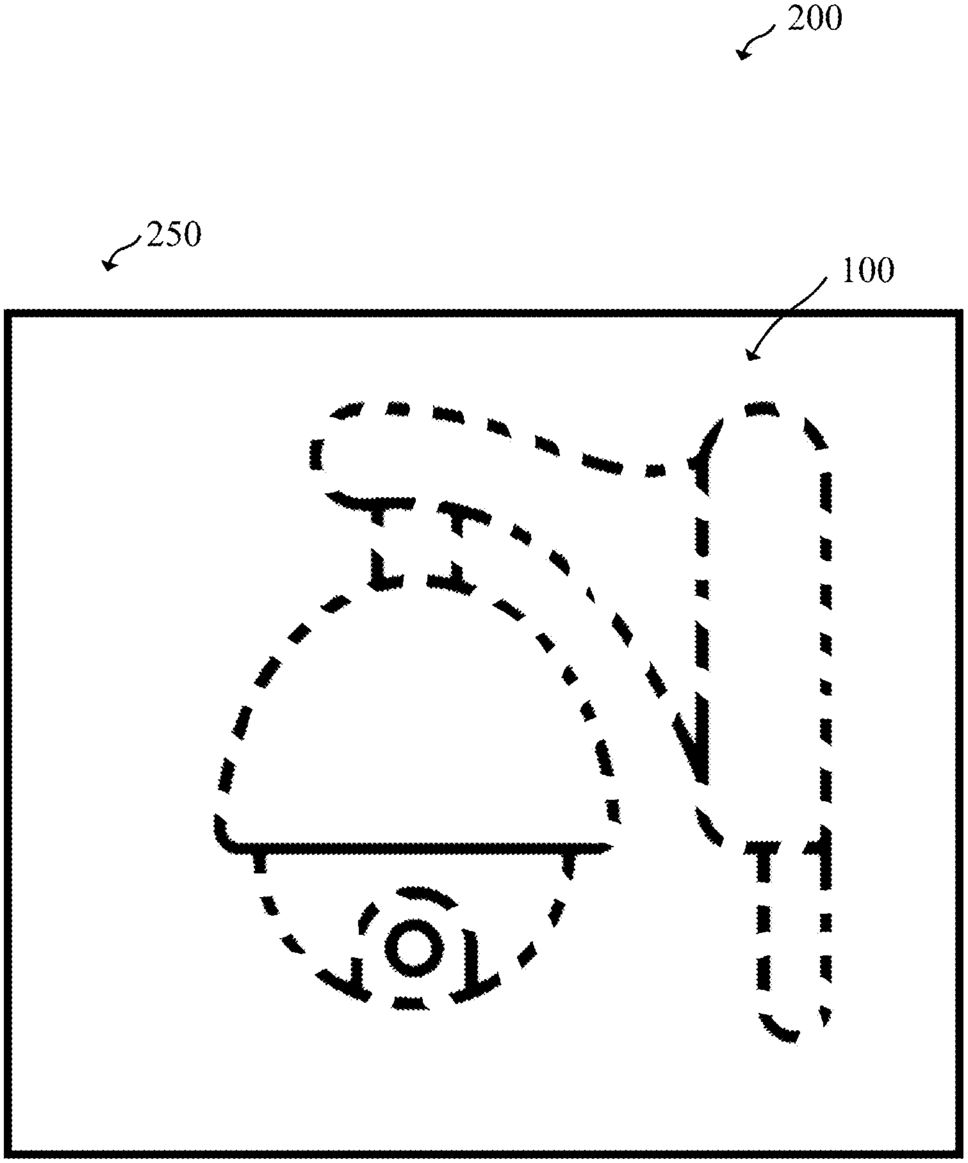
FIG. 2 is a block diagram an example of the camera system of FIG. 1 in a packaged state, in accordance with an example aspect.

Referring to FIG. 2, an example of camera system 100 of FIG. 1 in a packaged state 200 is shown, in accordance with an example aspect. In the aspect of FIG. 2, camera system 100 is placed in a package 250. The package 250 may include any type of packaging components, e.g., cardboard forms, foam, bubble wrap, etc. In the illustrated example, the package 250 is shown without any features of the present disclosure for simplicity. Moreover, while shown as an assembled unit, it is more likely that camera system components (e.g., the housing 110, the adjustable focus lens 120, etc.) will be separated by packaging components.

Figure 3:
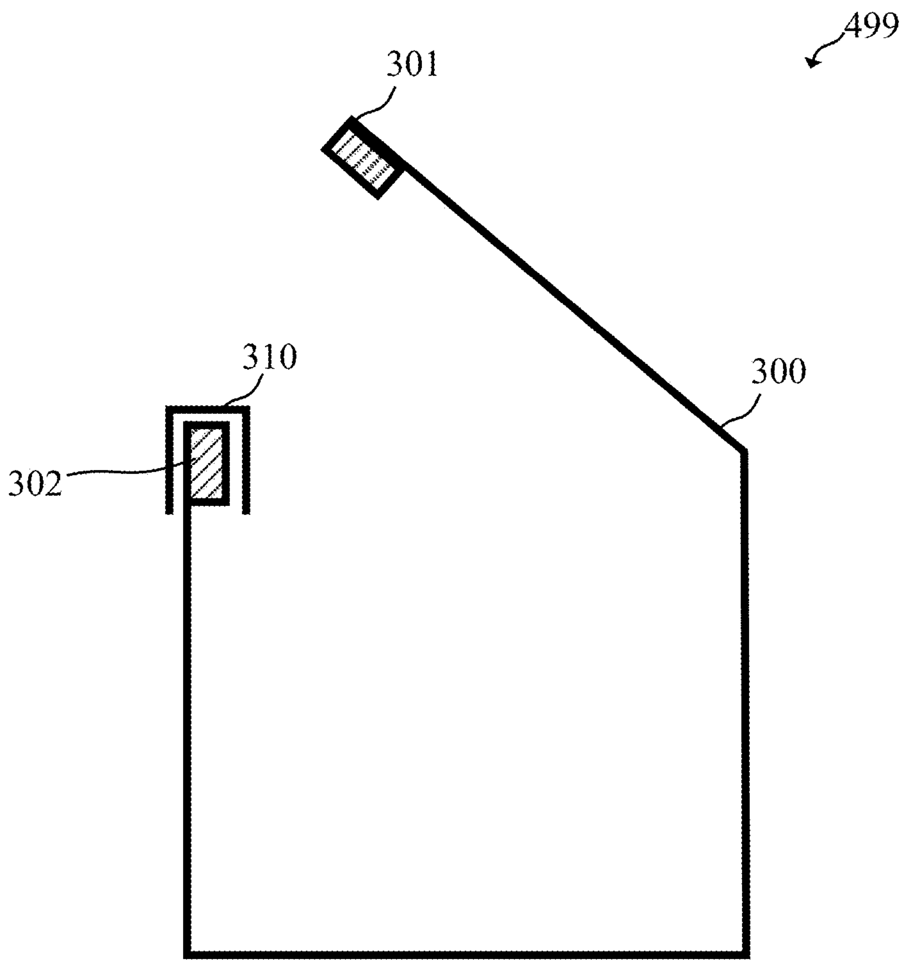
FIG. 3 is a block diagram of an example packaging for the camera system of FIG. 1, in accordance with an example aspect.
Figure 4:
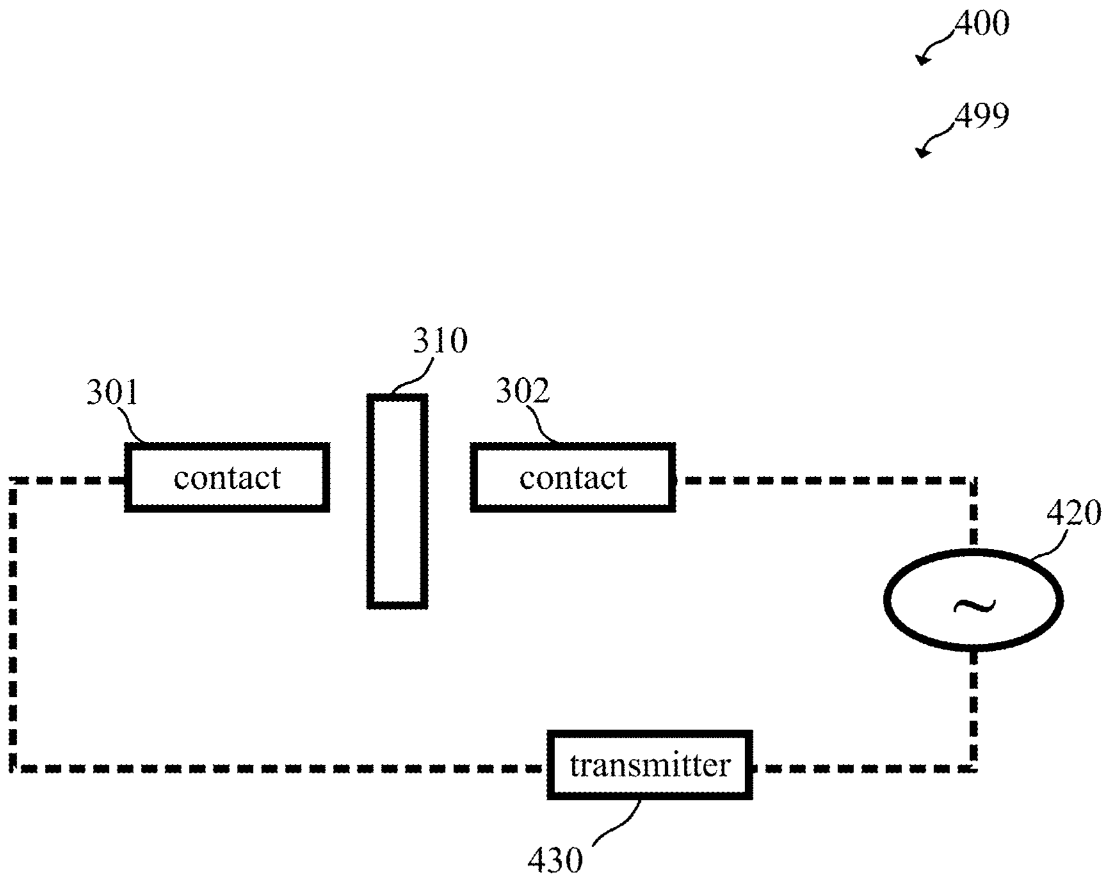
FIG. 4 is a block diagram of an example connection detection circuit for the packaging of FIG. 3, in accordance with an example aspect.

Referring to FIG. 3, an example packaging 300 for the camera system 100 of FIG. 1 is shown, in accordance with an example aspect, where the packaging 300 is an example of at least a portion of the package 250 (FIG. 2) and a connection detection circuit 499 (described in more detail in FIG. 4). Referring to FIG. 4, an example of the connection detection circuit 499 for the packaging 300 of FIG. 3 is shown, in accordance with an example aspect. The connection detection circuit 499 is shown in an open circuit condition.

Referring to FIGS. 3-4, packaging 300 includes connection detection circuit 499 that detects when the package has been opened, indicative of the camera system 100 being out of the packaging 300. While the example of FIGS. 3-4 have contacts 301 and 302 placed to detect the packaging 300 being opened, such contacts can also be placed within inner packaging elements to detect their separation, which may be a better indicator of the camera system 100 being out of the packaging 300. The first scenario is shown for illustrative purposes with the connection detection circuit 499 being the same for the second scenario with the only variation being the contact placement as explained above (edges of the box versus within packaging 300 such on and/or in packaging (e.g., foam, etc.) components.

In further detail, packaging 300 includes contacts 301 and 302 separated by insulator 310 (e.g., a piece of plastic tape or any other material exhibiting insulating properties when subjected to a current). The contacts 301 and 302 are formed of any material exhibiting conducting properties when subjected to an electrical current. In an aspect, the contacts 301 and 302 are formed of metal such as, for example, metal foil, copper, etc. The contacts 301 and 302 are electrically-connectable parts of connection detection circuit 499, where a connection between contacts 301 and 302, such as by removal of insulator 310, enables contacts 301 and 302 to connect to complete at least one circuit on the connection detection circuit 499, which indicates that camera system 100 is outside of packaging 300. In addition to contacts 301 and 302, connection detection circuit 499 further includes a power source 420 (such as, but not limited to, a battery such as a 1.5V battery) and a transmitter 430, which may be similar to communications transceiver 160 of the camera system 100. The transmitter 430 can be configured to send a signal to communications transceiver 160 of camera system 100 indicative of camera system 100 being outside packaging 300 responsive to the connection between contacts 301 and 302 being made, and the signal is communicated to the controller 170, which causes the controller 170 of the camera system 100 to respond by lifting a default restriction on the performance by the camera system 100 of one or more of a first set of functions (e.g., potentially dangerous functions) on power up. The transmitter 430 can be configured to send the signal upon power up, which, in the configuration shown in FIG. 4, would only occur when the circuit is complete, i.e., the connection between contacts 301 and 302 is made. Other circuits can be used as readily appreciated by one of skill in the art. In another aspect, the contacts 301 and 302 are implemented in the camera system 100, which avoids the needs for a separate battery as the camera system has its own power source and this could also avoid the need for a transmitter/receiver between the packaging and camera system 100.

Figure 5:
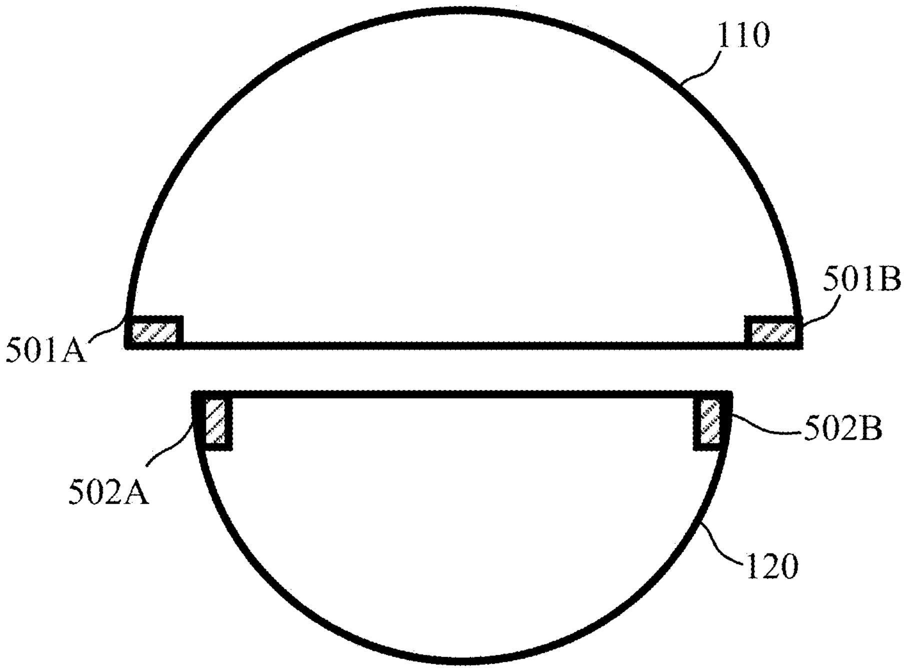
FIG. 5 is a block diagram of another example of a camera system, in accordance with an example aspect.
Figure 6:
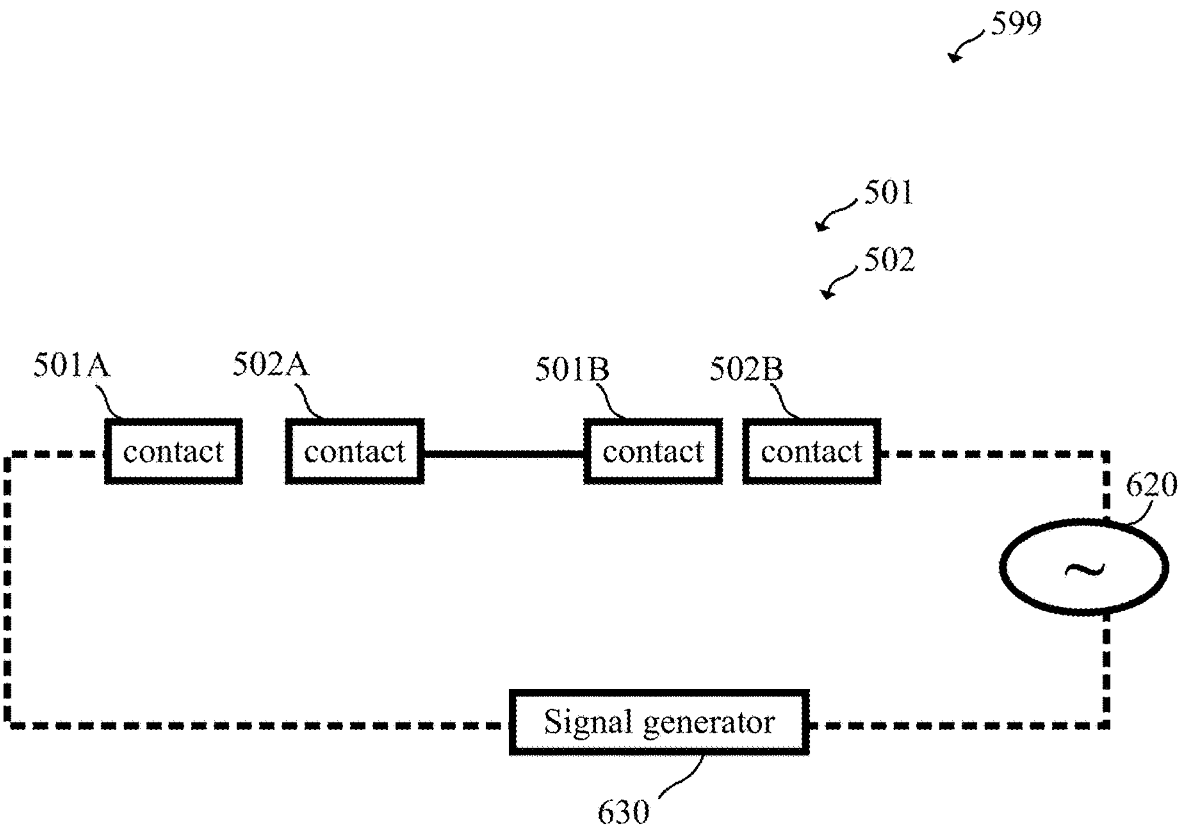
FIG. 6 is a block diagram of an example connection detection circuit 599 for the camera system of FIG. 5, in accordance with an example aspect.

Referring to FIG. 5, another example of a camera system 500 is shown, in accordance with an example aspect, wherein the camera system 500 is an example of at least a portion of camera system 100 (FIG. 1), such as the housing 110 and the lens 120. Referring to FIG. 6, an example connection detection circuit 599 for the camera system 500 of FIG. 5 is shown, in accordance with an example aspect. A connection detection circuit 599, similar to connection detection circuit 499, is shown in an open circuit condition.

The camera system 500 includes a first contact pair 501 having a contact 501A and a contact 501B and a second contact pair 502 having a contact 502A and a contact 502B, wherein the contact pairs 501, 502 are formed of any material exhibiting conducting properties when subjected to an electrical current. The first contact pair 501 and the second contact pair 502 are on component 511 and component 512, respectively, of camera system 500 meant to be connected in order to form detectable electric connections when the first contact pair 501 and the second contact pair 502 are coupled together. For example, first contact pair 501 can be located on housing 110 and second contact pair 502 can be located on adjustable focus lens 120. When adjustable focus lens 120 is coupled to housing 110, first contact pair 501 comes into contact with second contact pair 502 to close a connection detection circuit 599. In another aspect, first contact pair 501 can be located on the housing 110 and second contact pair 502 can be located on the camera system mount 150.

The first contact pair 501 and second contact pair 502 are part of connection detection circuit 599 that generates a signal responsive to a connection between first contact pair 501 and second contact pair 502. The signal can be detected by the communications transceiver 160 and communicated to the controller 170, which can then respond by lifting a default restriction on the camera system 500 on the performance of one or more of a first set of functions (e.g., potentially dangerous functions) on power up. In addition to first contact pair 501 and second contact pair 502, the connection detection circuit 599 includes a power source 620 and a signal generator 630. The power source 620 can be similar to the power source 420 (e.g., a battery). The signal generator 530 can be a switch, a transistor (e.g., a field effects transistor), a relay, and so forth. It is to be appreciated that while two pairs on contacts 501 and 502 were used in the examples of FIG. 5-6, only one pair of contacts need be detected as closed, with the second pair simply used to close the circuit in this particular aspect given that the circuit spans a two objects, namely first camera system component 511 and second camera system component 512 of the camera system 500, versus the configurations of FIGS. 3-4 which simply resides on and/or in the packaging 300. Other circuit configurations of connection detection circuit 599 may only use only two contacts. For example, other circuit configurations may be used as readily appreciated by one of skill in the art.

Figure 7:
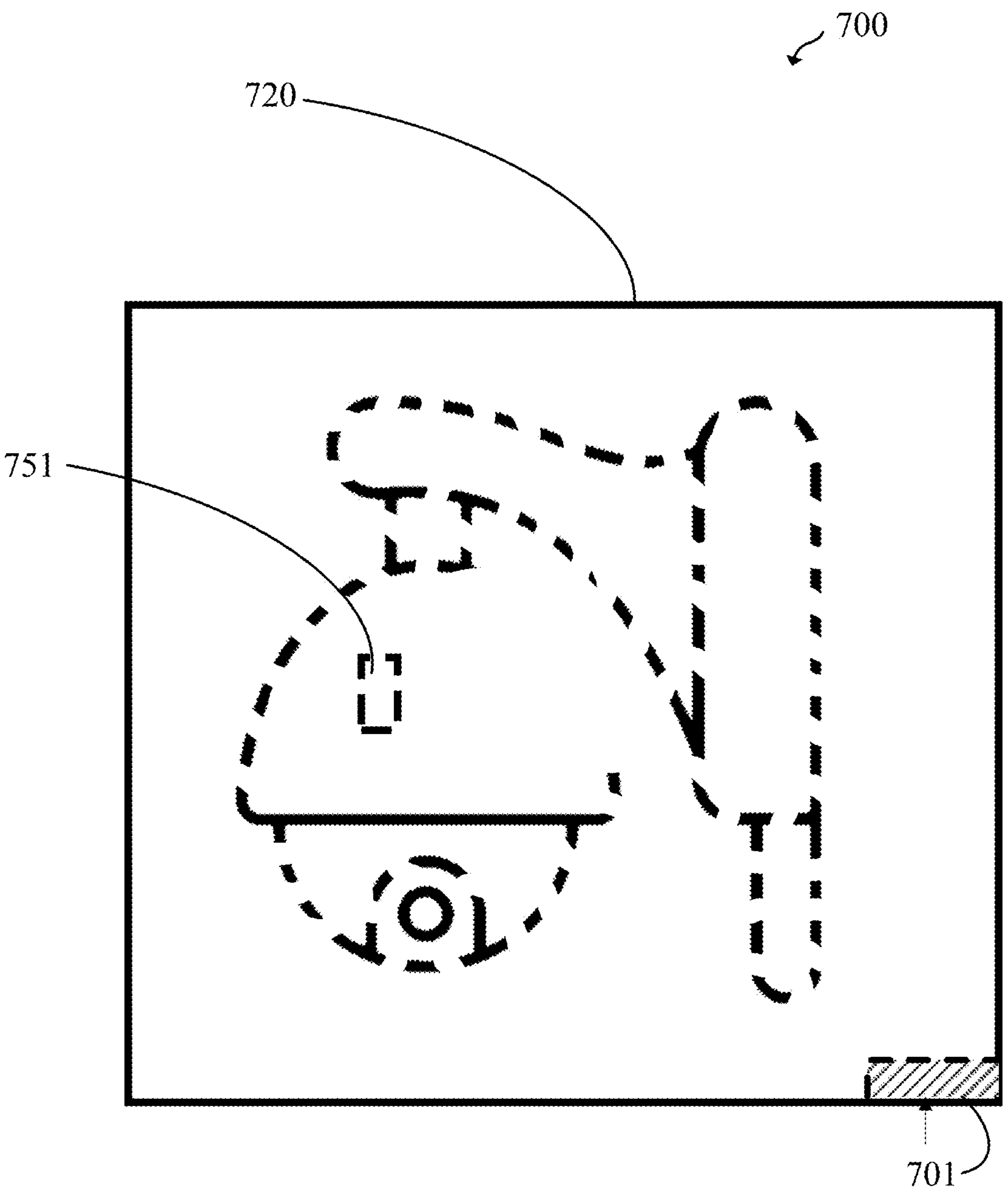
FIG. 7 is a block diagram an example of a camera system and cooperative packaging, in accordance with an example aspect.
Figure 8:
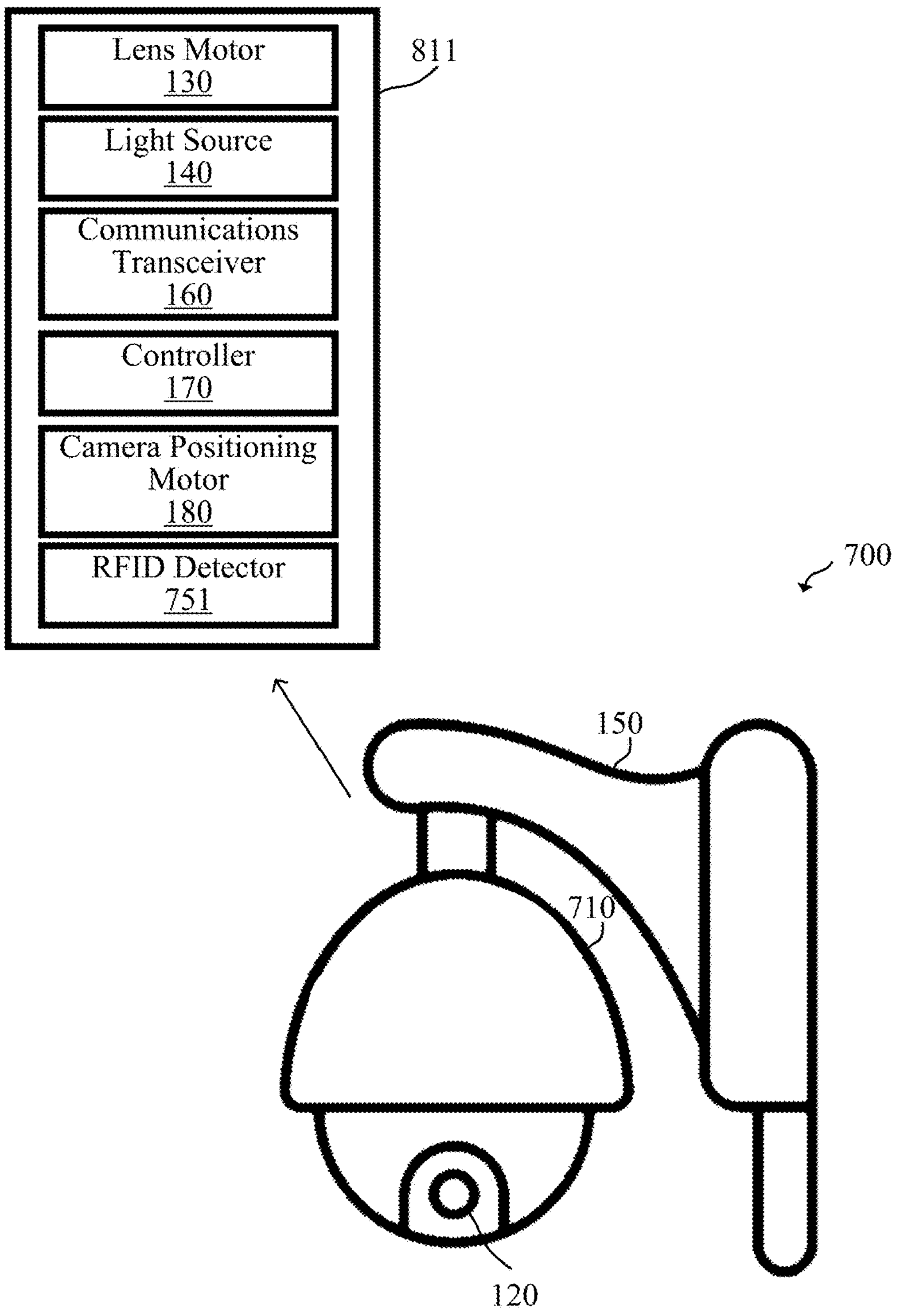
FIG. 8 is a block diagram of additional components the camera system of FIG. 7, in accordance with an example aspect.

Referring to FIG. 7, an example of a camera system 700 and packaging 720, in accordance with an example aspect, wherein the camera system 700 may be an example of camera system 100 (FIG. 1) and the packaging 720 may be an example of package 250 (FIG. 2). Referring to FIG. 8, camera system 700 of FIG. 7 is further shown, in accordance with an example aspect.

On board elements 811, similar to on-board elements 111, may include one or more of: lens motor 130; light source 140; communications transceiver 160; controller 170; camera positioning motor 180; and may additional include short range wireless communication detector 751 configured for detecting one or more types or protocols of short range wireless communications (e.g., radio frequency identification (RFID), near field communication (NFC)). The packaging 720 includes a short range wireless (e.g., radio frequency identification (RFID), near field communication (NFC), etc.) tag 701 for interacting with a short range wireless communication detector 751 associated with the camera system 700 (e.g., within or external to housing 110). Due to the low power used in short range wireless tag 701, short range wireless tag 701 can be detected by short range wireless detector 751 when it is proximate to, essentially within, packaging 720. In this way, removal of camera system 700 from packaging 720 will result in a non-detection of signal upon power up of the camera system 700, resulting in controller 170 of camera system 700 responding by lifting a default restriction on the performance of one or more of a first set of functions (e.g., potentially dangerous functions) on power up.

Figure 9:
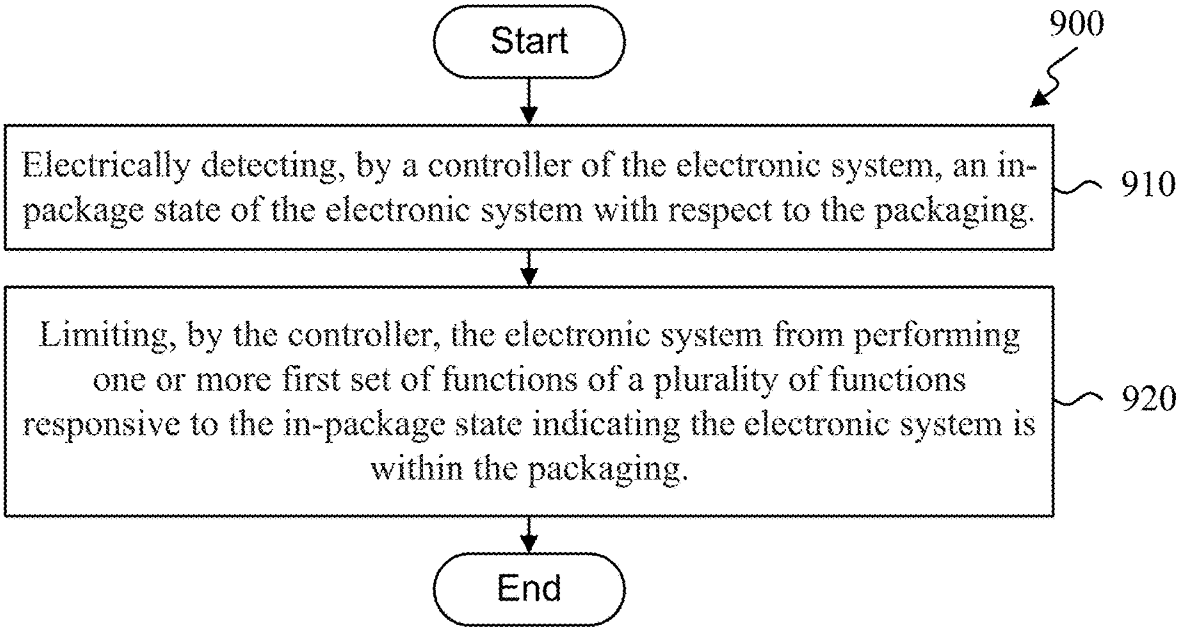
FIGS. 9-13 are flow diagrams of a method for protecting a camera system in packaging, in accordance with various example aspects.

Referring to FIG. 9, an example method 900 for protecting an electronic system in packaging is shown, in accordance with various example aspects. Referring to FIGS. 10-13, respective sub-blocks of method 900 for protecting an electronic system in packaging are shown, in accordance with various example aspects. The electronic system involved in method 900 can be camera system 100 of FIG. 1, camera system 500 of FIG. 5, camera system 700 of FIG. 7, fan system 1400 of FIG. 14, clothes washing machine 1500 of FIG. 15 and/or any electronic system having a controller and a feature that should not be performed while the electronic system is packaged. As an example, the method 900 may be performed by controller 170 of electronic system 100.

Referring to FIG. 9, at block 910, the method 900 includes electrically detecting, by a controller 170 of the electronic system 100, an in-package state of the electronic system 100 with respect to the packaging 300. The term "in-package state" refers to whether or not an object is within its packaging, as described above with reference to FIGS. 1-8. This is because certain function/features/capabilities should be restricted while the object is within its packaging to avoid damage to the object.

At block 920, the method 900 includes limiting, by the controller 170, the electronic system 100 from performing one or more first set of functions of a plurality of functions responsive to the in-package state indicating the electronic system 100 is within the packaging 300. This enables elements of an object that should not be used until the elements are unpacked to be rendered inoperable and/or otherwise unavailable for use. Thus, for example, the movement of a clothes washing or clothes drying drum, the extension of a camera lens, the powering on of a LED, and so forth, can be limited to prevent damage of the elements and/or the object. Further aspects of limiting the functions is described above with reference to FIGS. 1-8.

Figure 10:
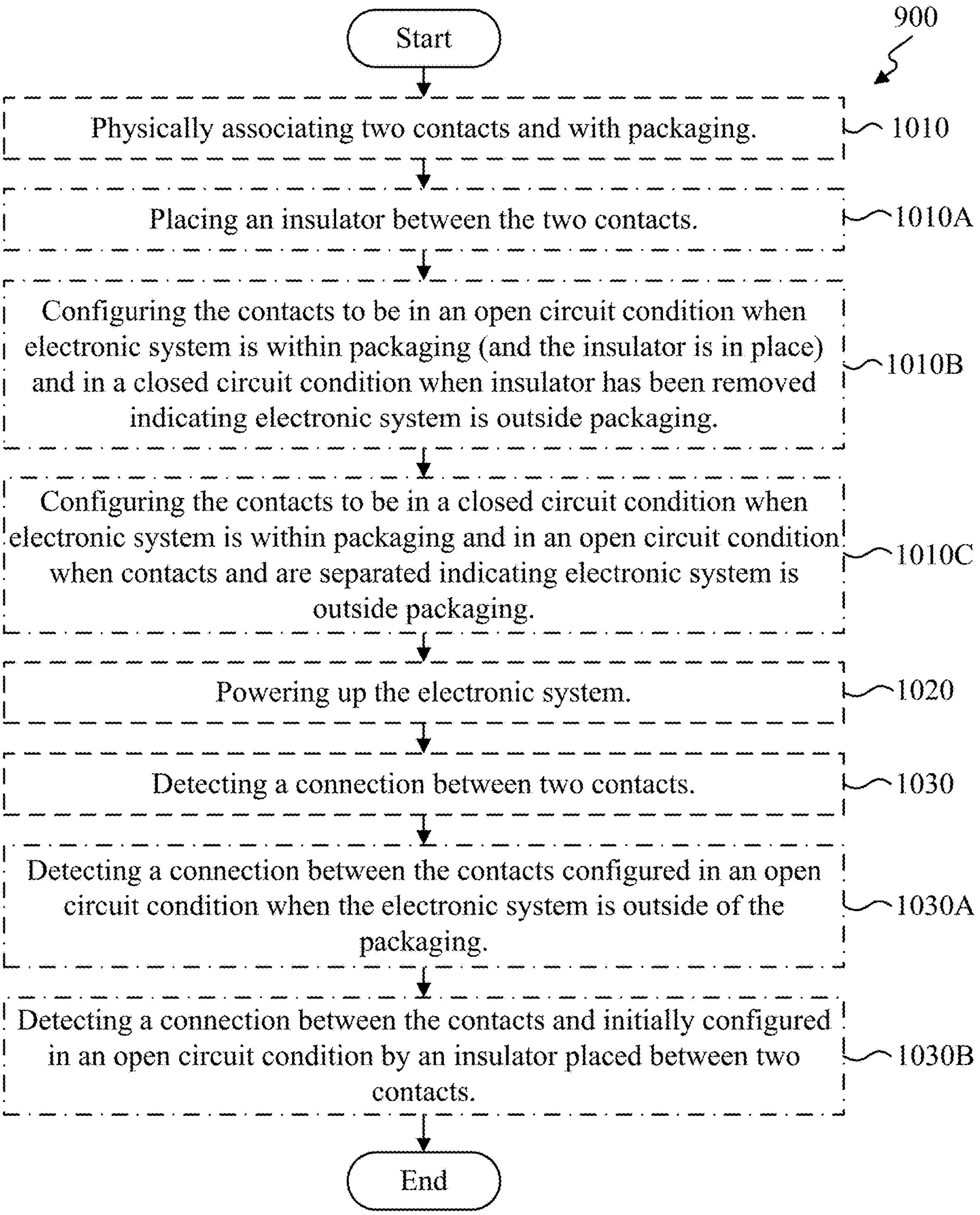

Referring to FIGS. 1, 3-4 and 10, further sub-blocks of method 900 of FIG. 9 are shown in FIG. 10 with reference to the elements and description provided above with respect to at least FIGS. 1 and 3-4.

At block 1010, the method 900 includes physically associating two contacts 401 and 402 with packaging 300. "Physically associating two contacts 401 and 402 with packaging 300" means placing two contacts 401 and 402 at least partially on and/or partially within packaging 300, such as locating the two contacts 401 and 402 on adjacent components of the packaging 300. In an aspect, two contacts 401 and 402 are physically associated with packaging 300 using adhesive. In an aspect, two contacts 401 and 402 are physically associated with packing 300 by a robot. In this case, the two contacts may not be touching one another.

In an aspect, block 1010 may include block 1010A through 1010C.

At block 1010A, the method 900 includes placing an insulator 410 between contacts 401 and 402.

At block 1010B, the method 900 includes configuring contacts 401 and 402 to be in an open circuit condition when electronic system 100 is within packaging 300 (and the insulator 410 is in place) and in a closed circuit condition when insulator 410 has been removed indicating electronic system 100 is outside packaging 300.

At block 1010C, the method 900 includes configuring contacts 401 and 402 to be in a closed circuit condition when electronic system 100 is within packaging 300 and in an open circuit condition when contacts 401 and 402 are separated indicating electronic system 100 is outside packaging 300.

At block 1020, the method 900 includes powering up the electronic system 100. In an aspect, the packaging 300 provides an access route to a power button for powering up the electronic system 100 without entering any of the function modes (first set of functions or second set of functions) of the electronic system 100. It is to be appreciated that by default, the dangerous functions are limited from being performed on power up until it is determined that the electronic system 100 is outside the packaging At block 1030, the method 900 includes detecting a connection between two contacts 401 and 402.

In an aspect, block 1030 may include one or more of blocks 1030A and 1030B.

At block 1030A, the method 900 includes detecting a connection between two contacts 401 and 402 configured in an open circuit condition when the electronic system 100 is outside of the packaging 300. In an aspect, the connection represents to controller 170 that the electronic system 100 being within the packaging 300, and the electronic system is limited from performing the one or more first set of functions responsive to a detection of the connection.

At block 1030B, the method 900 includes detecting a connection between two contacts 401 and 402 initially configured in an open circuit condition by an insulator 410 placed between two contacts 401 and 402. The connection indicates the electronic system is outside the packaging. The open circuit condition indicates the electronic system is inside the packaging.

Figure 11:
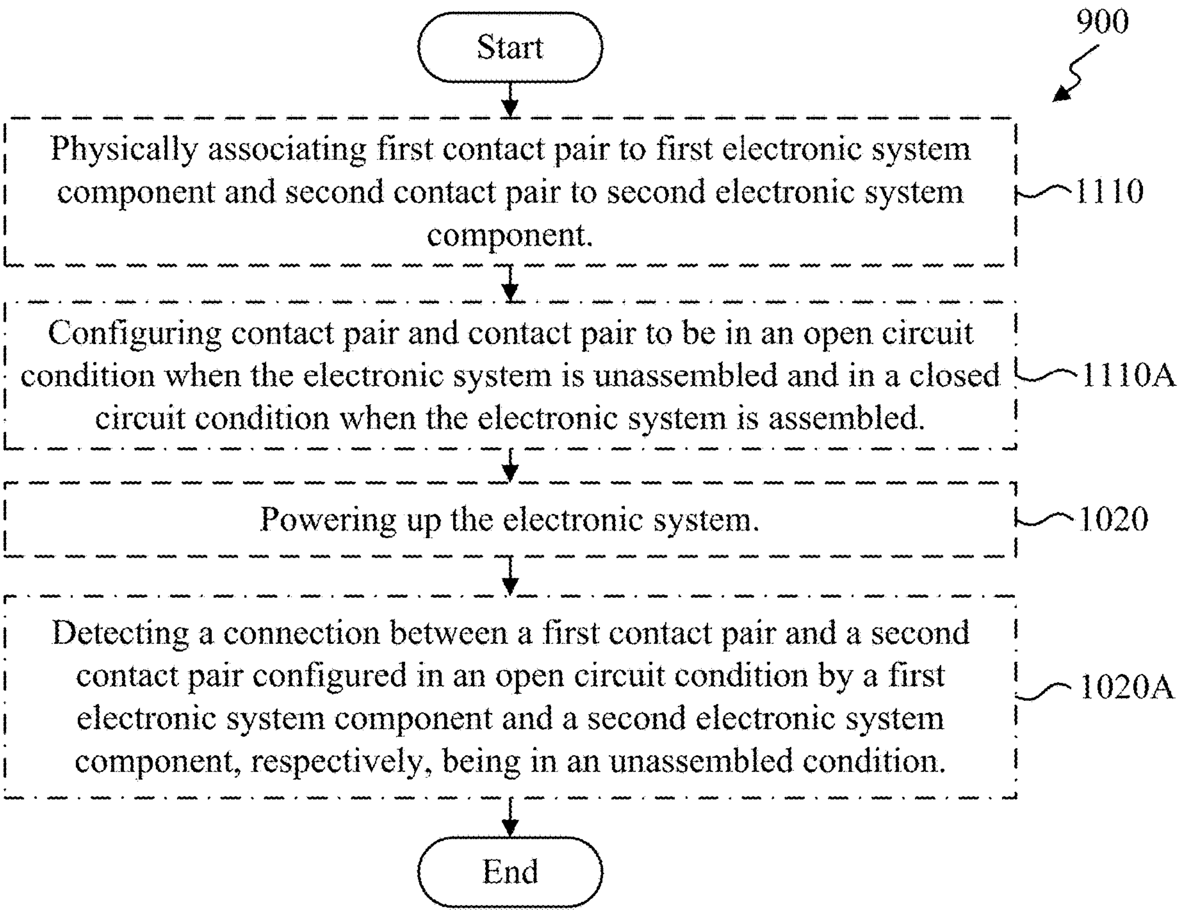

Referring to FIGS. 1, 5-6 and 11, further sub-blocks of method 900 of FIG. 9 are shown in FIG. 11 with reference to the elements in at least FIGS. 1 and 5-6.

At block 1110, the method 900 includes physically associating first contact pair 501 to first electronic system component 511 and second contact pair 502 to second electronic system component 512. "Physically associating first contact pair 501 to first electronic system component 511 and second contact pair 502 to second electronic system component 512" means placing first contact pair 501 at least partially on and/or partially within first electronic system component 511 (e.g., lens) and placing second contact pair 502 at least partially on and/or partially within second electronic system component 512 (e.g., housing). In an aspect, first contact pair 501 and second contact pair 502 are physically associated with first electronic system component 511 and second electronic component 512 using adhesive. In an aspect, first contact pair 501 and second contact pair 502 are physically associated with first electronic system component 511 and second electronic system component 512, respectively, by a robot.

In an aspect, block 1110 may include block 1110A.

At block 1110A, the method 900 includes configuring contact pair 501 and contact pair 502 to be in an open circuit condition when the electronic system 100 is unassembled and in a closed circuit condition when the electronic system 100 is assembled.

At block 1020, the method 900 includes powering up the electronic system. In an aspect, the packaging provides an access route to a power button for powering up the electronic system without entering any of the function modes (first set of functions or second set of functions) of the electronic system. It is to be appreciated that by default, the dangerous functions are limited from being performed on power up until it is determined that the electronic system is outside the packaging In an aspect, block 1020 may include block 1020A.

At block 1020A, the method 900 includes detecting a connection between a first contact pair 501 and a second contact pair 502 configured in an open circuit condition by a first electronic system component 511 and a second electronic system component 512, respectively, being in an unassembled condition. The open circuit condition indicates the electronic system is inside the packaging. The connection indicates the electronic system is outside the packaging.

Figure 12:
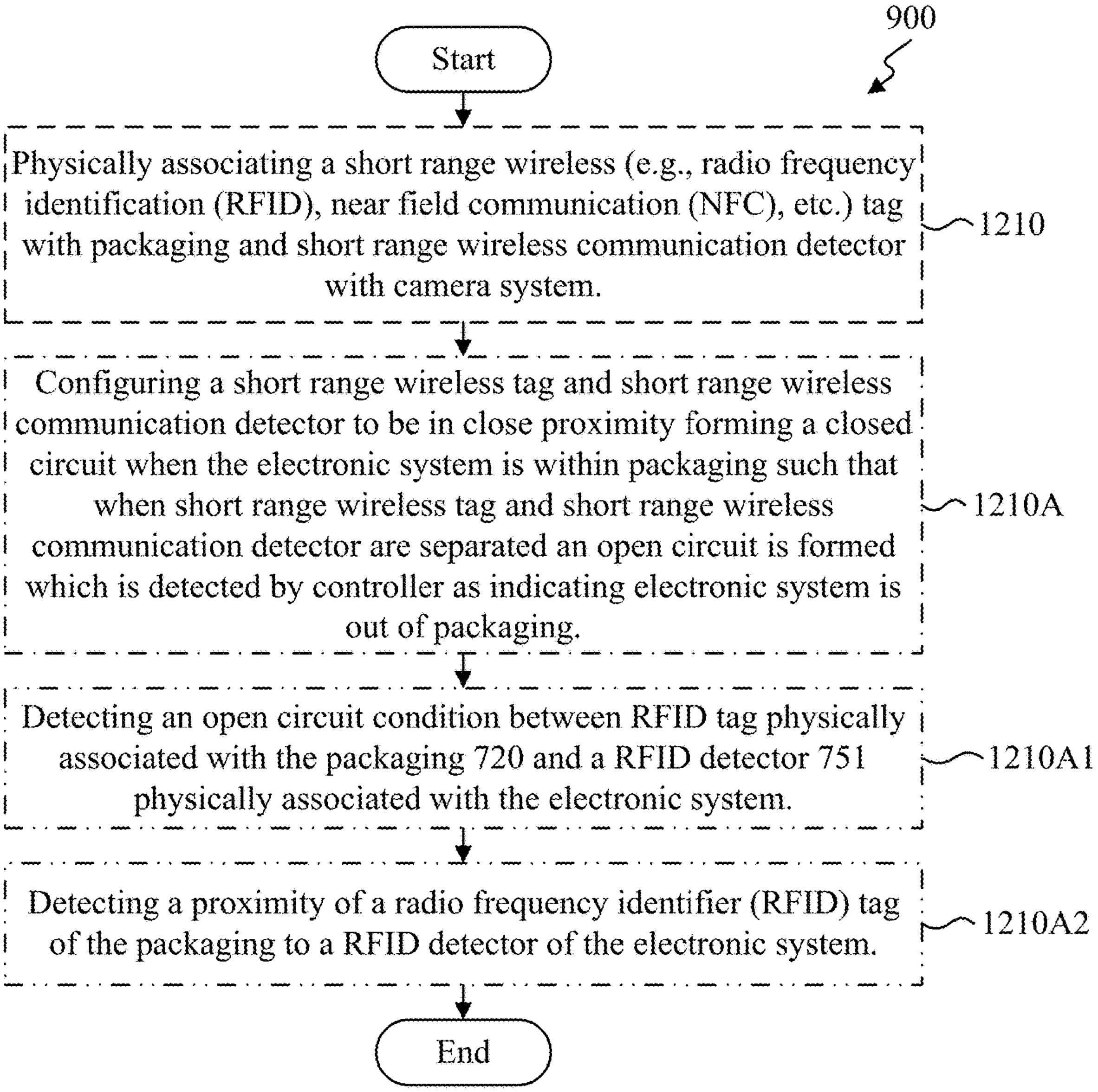

Referring to FIGS. 1, 7-8 and 12, further sub-blocks of method 900 of FIG. 9 are shown in FIG. 12 with reference to the elements in at least FIGS. 1 and 7-8.

At block 1210, the method 900 includes physically associating a short range wireless (e.g., radio frequency identification (RFID), near field communication (NFC), etc.) tag 701 with packaging 720 and short range wireless communication detector 751 with camera system 700. "Physically associating short range wireless tag 701 with packaging 720" means placing short range wireless tag 701 at least partially on and/or partially within packaging 720. "Physically associating short range wireless detector 751 with camera system 700" means placing short range wireless detector 751 at least partially on and/or within camera system 700. In an aspect, RFID tag 701 is physically associated with packaging 720 and short range wireless detector 751 is physically associated with camera system 700 using adhesive. In an aspect, short range wireless tag 701 and short range wireless communication detector 751 are physically associated with packaging 720 and camera system 700, respectively, by a robot.

In an aspect, block 1210 may include block 1201A.

At block 1210A, the method 900 includes configuring a short range wireless tag 701 and short range wireless communication detector 751 to be in close proximity forming a closed circuit when the electronic system 700 is within packaging 720 such that when short range wireless tag 701 and short range wireless communication detector 751 are separated an open circuit is formed which is detected by controller 170 as indicating electronic system 700 is out of packaging 720.

In an aspect, block 1210A may include one or more of blocks 1210A1 and 1210A2.

At block 1210A1, the method 900 includes detecting an open circuit condition between RFID tag physically associated with the packaging 720 and a RFID detector 751 physically associated with the electronic system.

At block 1210A2, the method 900 includes detecting a proximity of a radio frequency identifier (RFID) tag of the packaging to a RFID detector of the electronic system.

Figure 13:
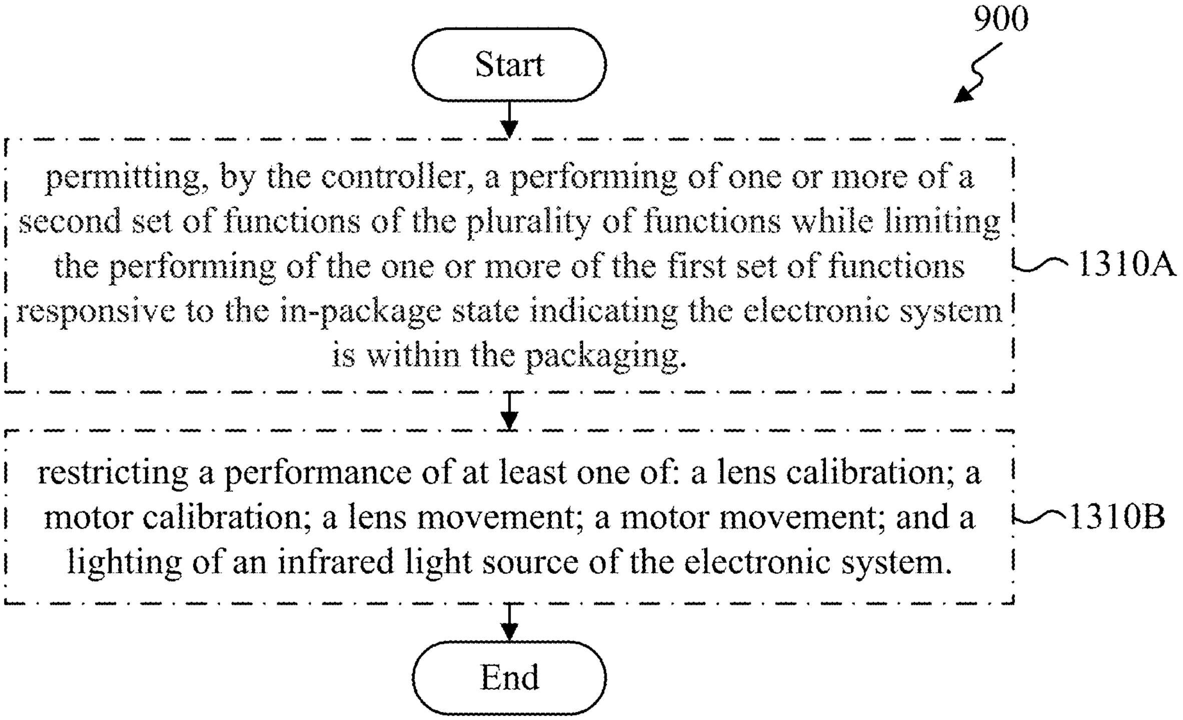

Referring to FIG. 13, further sub-blocks of method 900 are shown, in accordance with an example aspect.

At block 1310A, the method 900 includes permitting, by the controller, a performing of one or more of a second set of functions of the plurality of functions while limiting the performing of the one or more of the first set of functions responsive to the in-package state indicating the electronic system is within the packaging.

At block 1310B, the method 900 includes restricting a performance of at least one of: a lens calibration; a motor calibration; a lens movement; a motor movement; and a lighting of an infrared light source of the electronic system.

Figure 14:
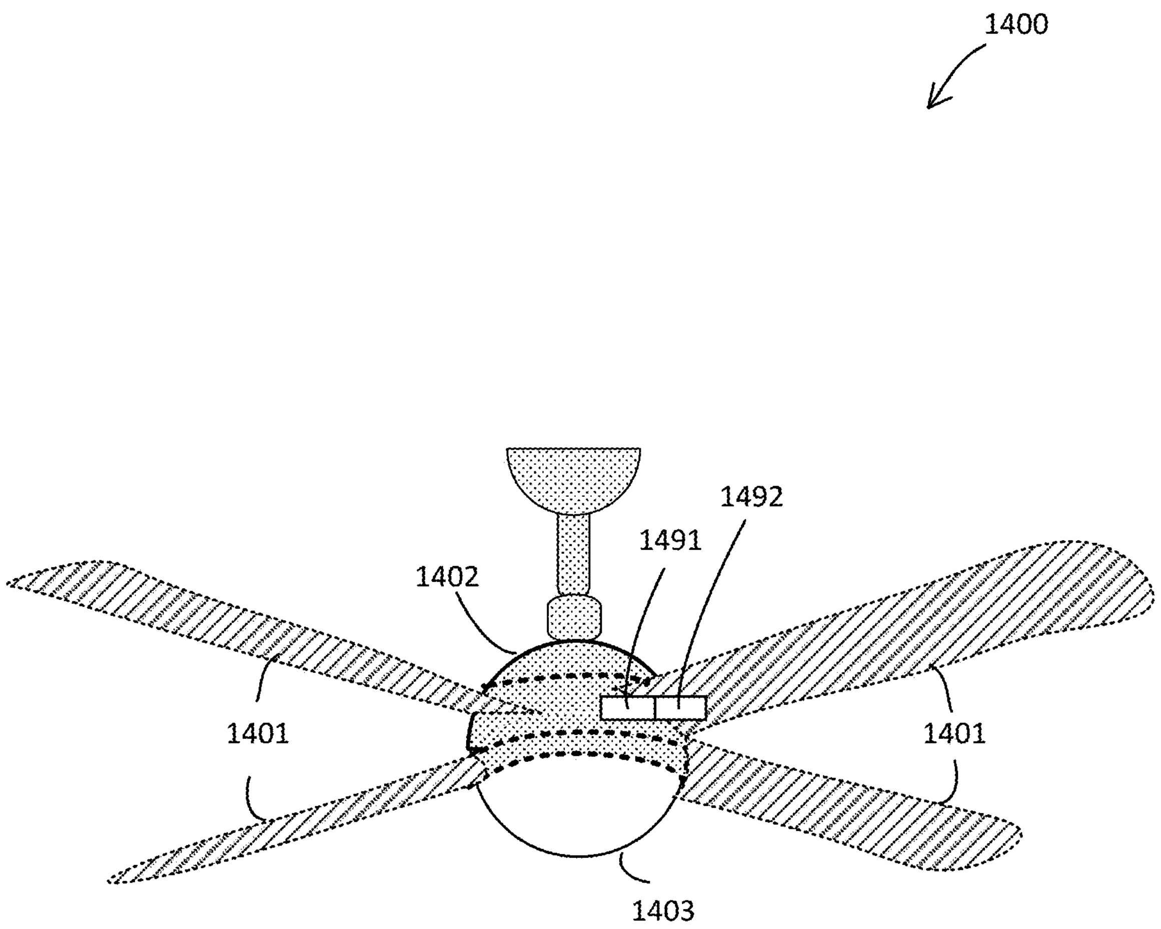
FIG. 14 is a block diagram of an example of a fan system, in accordance with an example aspect.

Referring to FIG. 14, an example of a fan system 1400 is shown, in accordance with an example aspect. In an aspect, contacts 1491 and 1492 may be included in or on the blades 1401 and the housing/motor 1402 so when the blades 1401 are inserted into the housing/motor 1402, a signal is sent indicating the fan system 1400 is outside of the packaging (not shown). Other contact arrangements can be used, as described herein, including involving just the fan system 1400, just the packaging, or both the fan system 1400 and the packaging. It is noted that a controller and power source are not shown in FIG. 14. The controller, in conjunction with the power source and contacts 1491 and 1492, operate to restrict one or more of a first set of function such as rotating of the motor until the blades are attached indicating the fan system 1400 is outside the packaging. Other arrangements and circuits as described herein for the camera systems can be used for the fan system 1400.

Figure 15:
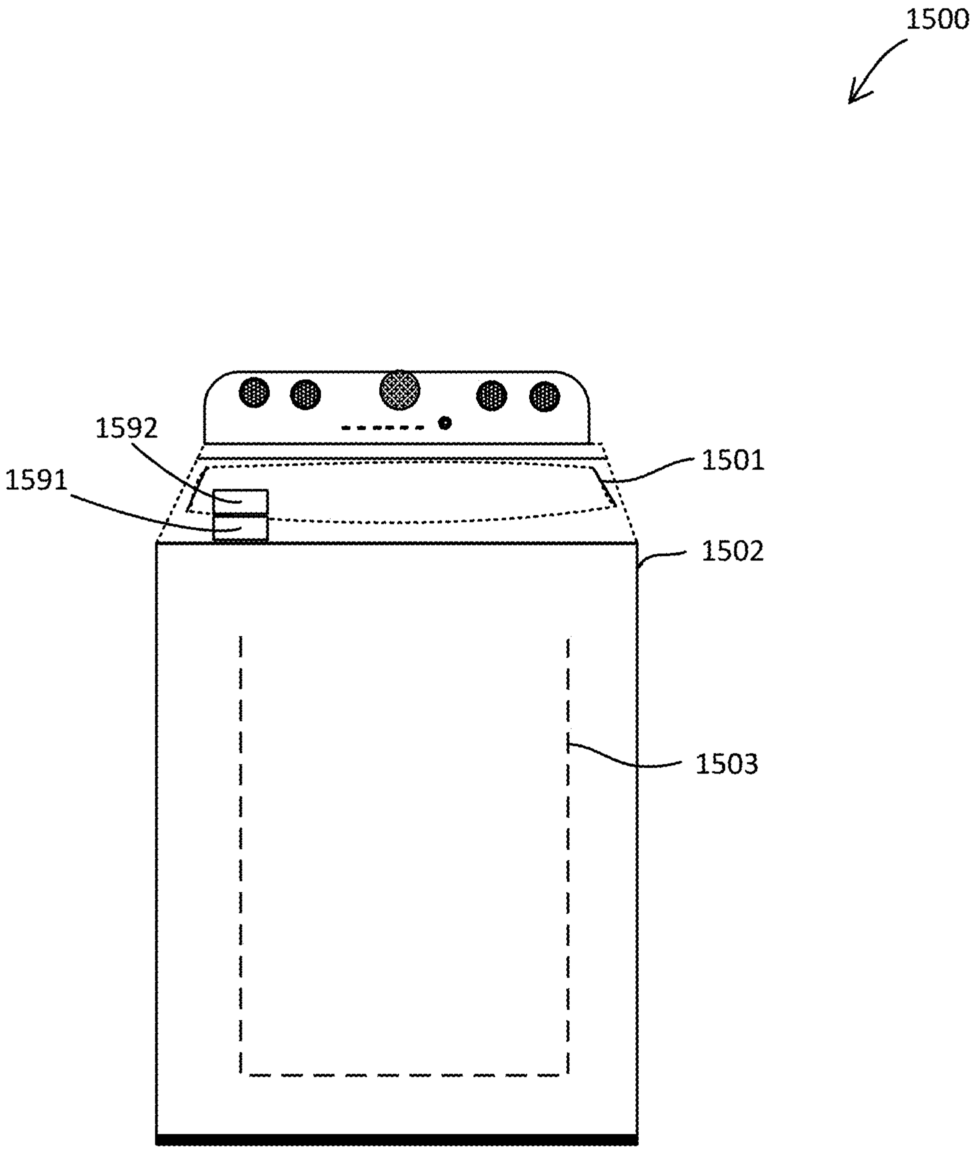
FIG. 15 is a block diagram of an example of clothes washing system, in accordance with an example aspect.

Referring to FIG. 15, an example of clothes washing system 1500 is shown, in accordance with an example aspect. Often, instructions are placed within the clothes washing system 1500 itself. Contacts 1591 and 1592 may be configured in an open or closed configuration. For example, the top door 1501 may be closed with respect to the housing 1502 forming a closed circuit that is broken once the top door 1501 is opened (separated from the housing 1502) to retrieve the instructions. Other contact arrangements can be used, as described herein, including involving just the clothes washing system 1500, just the packaging (not shown), or both the clothes washing system 1500 and the packing. In this way, the drum 1503 can be kept from moving until the clothes washing system 1500 is determined to be outside of the packaging. It is noted that a controller and power source are not shown in FIG. 15. The controller, in conjunction with the power source and contacts 1491 and 1492, operate to restrict one or more of a first set of function such as rotating of the motor that drives the drum 1503 until a signal is generated/received indicating the clothes washing system 1500 is outside the packaging. Other arrangements and circuits as described herein for the camera systems can be used for the clothes washing system 1500.

Figure 16:
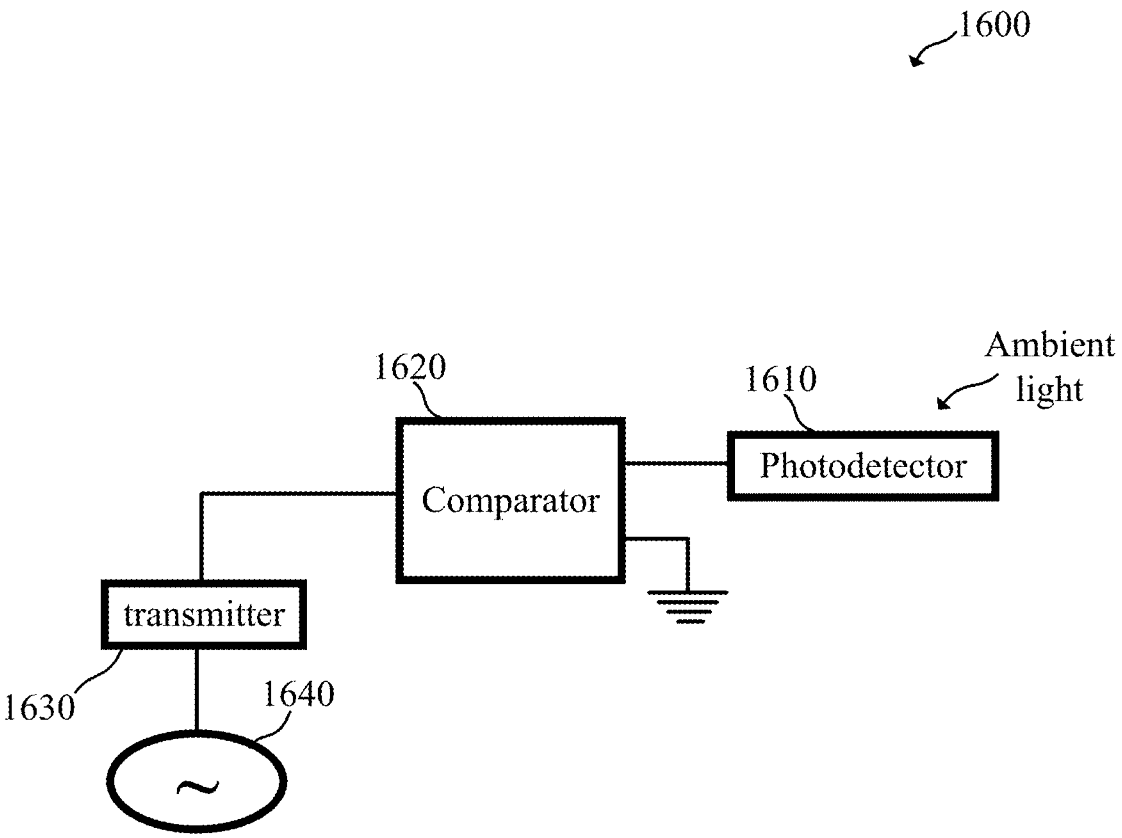
FIG. 16 is a schematic of an example circuit for detecting an exposure of inner packing to ambient light indicative of unpacking an object, in accordance with an example aspect.

Referring to FIG. 16, an example circuit 1600 for detecting an exposure of inner packing to ambient light indicative of unpacking an object is shown, in accordance with an example aspect. For example, circuit 1600 may be located within packaging or an electronic system stored within packaging, and combined with or used in place of the connection detection circuits described above, in order to detect if the electronic system is within or has been removed from the packaging.

The circuit 1600 includes a photodetector 1610 providing an input to a comparator 1620 also having a reference input 1615. The reference input 1615 may be substantially close to zero (or, e.g., another value corresponding to non-exposure of the photodetector 1610 to ambient light), such that exposure of the photodetector (e.g., a photodiode and/or other photosensitive device) 1610 to ambient light causes a differential input to be applied to the comparator 1620 that exceeds a threshold value and results in a change in the output of the comparator 1620 indicating an intended unpacking of a packed object. The output of the comparator 1620 is provided to a transmitter 1630 that is powered by a power source 1640 (e.g., a battery). A corresponding receiver (not shown) of the object may receive a signal from the transmitter 1630 indicative of an item being unpacked or packed and send a signal to an onboard controller to permit or restrict certain functions and/or capabilities of the item.

These elements and others such as operational amplifiers and rectifiers may be used to condition the involved signals.

Of course, other detection circuits for detecting whether an object has been unpacked from its packaging may be used given the teachings of the present disclosure provided herein.

Additional aspects of the present disclosure may include one or more of the following clauses.

Clause 1. A method for protecting an electronic system in packaging, comprising: electrically detecting, by a controller of the electronic system, an in-package state of the electronic system with respect to the packaging; and limiting, by the controller, the electronic system from performing one or more first set of functions of a plurality of functions responsive to the in-package state indicating the electronic system is within the packaging.

Clause 2. The method in accordance with clause 1, further comprising permitting, by the controller, a performing of one or more of a second set of functions of the plurality of functions while limiting the performing of the one or more of the first set of functions responsive to the in-package state indicating the electronic system is within the packaging.

Clause 3. The method in accordance with any preceding clause, wherein electrically detecting the in-package state of the electronic system comprises detecting no connection between two contacts associated with the electronic system or the packaging.

Clause 4. The method in accordance with clause 3, further comprising configuring the two contacts to be in an open circuit condition when the electronic system is within the packaging and in a closed circuit condition when the electronic system is outside the packaging.

Clause 5. The method in accordance with any preceding clause, wherein the two contacts are configured to be in the open circuit condition by an insulator placed between the two contacts.

Clause 6. The method in accordance with any preceding clause, further comprising physically associating the two contacts with the packaging.

Clause 7. The method in accordance with any preceding clause, further comprising physically associating the two contacts with the electronic system.

Clause 8. The method in accordance with any preceding clause, wherein the controller is configured to detect: the connection between the two contacts as indicating the electronic system is outside the packaging; and an open circuit condition between the two contacts as indicating the electronic system is inside the packaging.

Clause 9. The method in accordance with any preceding clause, wherein the two contacts are configured in an open circuit condition by electronic system components being in an unassembled condition, and wherein the connection is formed responsive to an electrical and physical coupling of the electronic system components to each other.

Clause 10. The method in accordance with any preceding clause, further comprising configuring the two contacts to be in a closed circuit condition when the electronic system is within the packaging and in an open circuit condition when the electronic system is outside the packaging.

Clause 11. The method in accordance with any preceding clause, wherein electrically detecting the in-package state of the electronic system comprises detecting a proximity of a short range wireless tag of the packaging to a short range wireless detector of the electronic system.

Clause 12. The method in accordance with any preceding clause, wherein limiting the electronic system from performing the one or more first set of functions of the plurality of functions comprises restricting a performance of at least one of: a lens calibration; a motor calibration; a lens movement; a motor movement; or a lighting of a light source of the electronic system.

Clause 13. The method in accordance with any preceding clause, wherein the method is performed by the controller upon a power-up of the electronic system.

Clause 14. A computer program product for protecting an electronic system in packaging, the computer program product comprising a non-transitory computer readable storage medium having program instructions stored thereon, the program instructions executable by a controller to cause the controller to perform a method comprising: electrically detecting an in-package state of the electronic system with respect to the packaging; and limiting the electronic system from performing one or more first set of functions of a plurality of functions responsive to the in-package state indicating the electronic system is within the packaging.

Clause 15. The computer program product in accordance with clause 14, wherein the method further comprises permitting, by the controller, a performing of one or more of a second set of functions from among the plurality of functions while limiting the performing of the first set of functions responsive to the detected in-package state indicating the electronic system is within the package.

Clause 16. The computer program product in accordance with any preceding clause, wherein electrically detecting the in-package state of the electronic system comprises detecting a connection between two contacts.

Clause 17. The computer program product in accordance with any preceding clause, wherein the controller is configured to detect: the connection between the two contacts as indicating the electronic system is outside the packaging; and an open circuit condition between the two contacts as indicating the electronic system is inside the packaging.

Clause 18. The computer program product in accordance with any preceding clause, wherein the two contacts are configured in an open circuit condition by electronic system components being in an unassembled condition, and wherein the connection is formed responsive to an electrical and physical coupling of the electronic system components to each other.

Clause 19. The computer program product in accordance with any preceding clause, wherein electrically detecting the in-package state of the electronic system comprises detecting a proximity of a short range wireless tag of the packaging to a short range wireless detector of the electronic system.

Clause 20. The computer program product in accordance with any preceding clause, wherein limiting the electronic system from performing the one or more first set of functions comprises restricting a performance of at least one of: a lens calibration; a motor calibration; a lens movement; a motor movement; and a lighting of a light source of the electronic system.

Clause 21. The computer program product in accordance with any preceding clause, wherein the method is performed by the controller upon a power-up of the electronic system.

Clause 22. An electronic system comprising: a controller configured to: electrically detect an in-package state of the electronic system with respect to packaging; and limit the electronic system from performing one or more first set of functions of a plurality of functions responsive to the in-package state indicating the electronic system is within the packaging.

Clause 23. The electronic system in accordance with clause 22, further comprising permitting, by the controller, a performing of a second set of functions from among the plurality of functions while limiting the performing of the first set of functions responsive to the detected in-package state indicating the electronic system is within the package.

Clause 24. The electronic system in accordance with any preceding clause, wherein the controller is configured to electrically detect the in-package state of the electronic system by detecting a connection between two contacts.

Clause 25. The electronic system in accordance with any preceding clause, wherein the controller is configured to detect: the connection between the two contacts as indicating the electronic system is outside the packaging; and an open circuit condition between the two contacts as indicating the electronic system is inside the packaging.

Clause 26. The electronic system in accordance with any preceding clause, wherein the controller is configured to detect the connection responsive to an electrical and physical coupling of electronic system components to each other.

Clause 27. The electronic system in accordance with any preceding clause, wherein the controller is configured to electrically detect the in-package state of the electronic system by detecting a proximity of a short range wireless tag of the packaging to a short range wireless detector of the electronic system.

Clause 28. The electronic system in accordance with any preceding clause, wherein the controller limits the electronic system from performing the one or more first set of functions including restricting a performance of at least one of: a lens calibration; a motor calibration; a lens movement; a motor movement; and a lighting of a light source of the electronic system.

Clause 29. The electronic system in accordance with any preceding clause, wherein the controller is configured to electrically detect the in-package state of the electronic system by detecting an exposure of a photosensitive device to ambient light.

The flowchart and block diagrams in the Figures illustrate the architecture, functionality, and operation of possible implementations of systems, methods, and computer program products (non-transitory computer readable storage mediums) according to various aspects of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one aspect" or "an aspect" of the present disclosure, as well as other variations thereof, means that a particular feature, structure, characteristic, and so forth described in connection with the aspect is included in at least one aspect of the present disclosure. Thus, the appearances of the phrase "in one aspect" or "in an aspect," as well any other variations, appearing in various places throughout the specification are not necessarily all referring to the same aspect.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

It will be appreciated that various implementations of the above-disclosed and other features and functions, or alternatives or varieties thereof, may be desirably combined into many other different systems or applications. Also that various presently unforeseen or unanticipated alternatives, modifications, variations, or improvements therein may be subsequently made by those skilled in the art which are also intended to be encompassed by the following claims.

It should be understood that the application is not limited to the details or methodology set forth in the following description or illustrated in the figures. It should also be understood that the phraseology and terminology employed herein is for the purpose of description only and should not be regarded as limiting.

While the example aspects illustrated in the figures and described herein are presently preferred, it should be understood that these aspects are offered by way of example only. Accordingly, the present application is not limited to a particular aspect, but extends to various modifications that nevertheless fall within the scope of the appended claims. The order or sequence of any processes or method steps may be varied or re-sequenced according to alternative aspects.

What is claimed is:

1. A method for protecting an electronic system in packaging, comprising:

electrically detecting, by a controller of the electronic system, an in-package state of the electronic system with respect to the packaging, wherein the electrically detecting comprises detecting a state of an electrical circuit that includes at least two contacts, including a first contact associated with the electronic system and a second contact associated with the packaging; and selectively limiting, by the controller, the electronic system from performing one or more first set of functions of a plurality of the electronic system functions responsive to the in-package state indicating the electronic system is within the packaging, while the controller remains powered on and the electronic system remains capable of performing a second set of functions of the plurality of functions.

2. The method in accordance with claim 1, further comprising permitting, by the controller, a performing of one or more of a second set of functions of the plurality of functions while limiting the performing of the one or more of the first set of functions responsive to the in-package state indicating the electronic system is within the packaging wherein the second set of functions includes at least one of: a software download, a firmware update, a configuration update, configuring user information, setting a date, or setting a time.

3. The method in accordance with claim 1, wherein electrically detecting the in-package state of the electronic system comprises detecting no connection between two contacts associated with the electronic system or the packaging.

4. The method in accordance with claim 3, further comprising configuring the two contacts to be in an open circuit condition when the electronic system is within the packaging and in a closed circuit condition when the electronic system is outside the packaging.

5. The method in accordance with claim 4, wherein the two contacts are configured to be in the open circuit condition by an insulator placed between the two contacts.

6. The method in accordance with claim 3, further comprising physically associating the two contacts with the packaging.

7. The method in accordance with claim 3, further comprising physically associating the two contacts with the electronic system.

8. The method in accordance with claim 3, wherein the controller is configured to detect:

the connection between the two contacts as indicating the electronic system is outside the packaging; and an open circuit condition between the two contacts as indicating the electronic system is inside the packaging.

9. The method in accordance with claim 3, wherein the two contacts are configured in an open circuit condition by electronic system components being in an unassembled condition, and wherein the connection is formed responsive to an electrical and physical coupling of the electronic system components to each other.

10. The method in accordance with claim 3, further comprising configuring the two contacts to be in a closed circuit condition when the electronic system is within the packaging and in an open circuit condition when the electronic system is outside the packaging.

11. The method in accordance with claim 1, wherein electrically detecting the in-package state of the electronic system comprises detecting a proximity of a short range wireless tag of the packaging to a short range wireless detector of the electronic system.

12. The method in accordance with claim 1, wherein limiting the electronic system from performing the one or more first set of functions of the plurality of functions comprises restricting a performance of at least one of: a lens calibration; a motor calibration; a lens movement; a motor movement; or a lighting of a light source of the electronic system.

13. The method in accordance with claim 1, wherein the electrically detecting and the selectively limiting are each performed by the controller as part of a power-up sequence of the electronic system, prior to the controller releasing a default restriction on the first set of functions method is performed by the controller upon a power-up of the electronic system.

14. A computer program product for protecting an electronic system in packaging, the computer program product comprising a non-transitory computer readable storage medium having program instructions stored thereon, the program instructions executable by a controller to cause the controller to perform a method comprising:

electrically detecting an in-package state of the electronic system with respect to the packaging, wherein the electrically detecting comprises detecting a state of an electrical circuit that includes at least two contacts, including a first contact associated with the electronic system and a second contact associated with the packaging; and selectively limiting the electronic system from performing one or more first set of functions of a plurality of the electronic system functions responsive to the in-package state indicating the electronic system is within the packaging, while the controller remains powered on and the electronic system remains capable of performing a second set of functions of the plurality of functions.

15. The computer program product in accordance with claim 14, wherein the method further comprises permitting, by the controller, a performing of one or more of a second set of functions from among the plurality of functions while limiting the performing of the first set of functions responsive to the detected in-package state indicating the electronic system is within the package wherein the second set of functions includes at least one of: a software download, a firmware update, a configuration update, configuring user information, setting a date. or setting a time.

16. The computer program product in accordance with claim 14, wherein electrically detecting the in-package state of the electronic system comprises detecting a connection between two contacts.

17. The computer program product in accordance with claim 16, wherein the controller is configured to detect:

the connection between the two contacts as indicating the electronic system is outside the packaging; and an open circuit condition between the two contacts as indicating the electronic system is inside the packaging.

18. The computer program product in accordance with claim 16, wherein the two contacts are configured in an open circuit condition by electronic system components being in an unassembled condition, and wherein the connection is formed responsive to an electrical and physical coupling of the electronic system components to each other.

19. The computer program product in accordance with claim 14, wherein electrically detecting the in-package state of the electronic system comprises detecting a proximity of a short range wireless tag of the packaging to a short range wireless detector of the electronic system.

20. The computer program product in accordance with claim 14, wherein limiting the electronic system from performing the one or more first set of functions comprises restricting a performance of at least one of: a lens calibration; a motor calibration; a lens movement; a motor movement; and a lighting of a light source of the electronic system.

21. The computer program product in accordance with claim 14, wherein the electrically detecting and the selectively limiting are each performed by the controller as part of a power-up sequence of the electronic system, prior to the controller releasing a default restriction on the first set of functions method is performed by the controller upon a power-up of the electronic system.

22. An electronic system comprising:

a controller configured to:

electrically detect an in-package state of the electronic system with respect to packaging, wherein electrically detecting comprises detecting a state of an electrical circuit that includes at least two contacts, including a first contact associated with the electronic system and a second contact associated with the packaging; and selectively limit the electronic system from performing one or more first set of functions of a plurality of the electronic system functions responsive to the in-package state indicating the electronic system is within the packaging, while the controller remains powered on and the electronic system remains capable of performing a second set of functions of the plurality of functions.

23. The electronic system in accordance with claim 22, further comprising permitting, by the controller, a performing of a second set of functions from among the plurality of functions while limiting the performing of the first set of functions responsive to the detected in-package state indicating the electronic system is within the package wherein the second set of functions includes at least one of: a software download, a firmware update, a configuration update, configuring user information, setting a date, or setting a time.

24. The electronic system in accordance with claim 22, wherein the controller is configured to electrically detect the in-package state of the electronic system by detecting a connection between two contacts.

25. The electronic system in accordance with claim 24, wherein the controller is configured to detect:

the connection between the two contacts as indicating the electronic system is outside the packaging; and an open circuit condition between the two contacts as indicating the electronic system is inside the packaging.

26. The electronic system in accordance with claim 24, wherein the controller is configured to detect the connection responsive to an electrical and physical coupling of electronic system components to each other.

27. The electronic system in accordance with claim 22, wherein the controller is configured to electrically detect the in-package state of the electronic system by detecting a proximity of a short range wireless tag of the packaging to a short range wireless detector of the electronic system.

28. The electronic system in accordance with claim 22, wherein the controller limits the electronic system from performing the one or more first set of functions including restricting a performance of at least one of: a lens calibration; a motor calibration; a lens movement; a motor movement; and a lighting of a light source of the electronic system.

* * * * *